United States Patent
Lu et al.

(10) Patent No.: US 8,009,603 B2
(45) Date of Patent: Aug. 30, 2011

(54) TRANSMITTING PAGE AND BROADCAST CONTROL CHANNEL THROUGH THE SAME TIME FREQUENCY RESOURCES ACROSS THE SECTORS IN A WIRELESS COMMUNICATIONS SYSTEM

(75) Inventors: Jianmin Lu, San Diego, CA (US); Quanzhong Gao, San Diego, CA (US); Yunsong Yang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 924 days.

(21) Appl. No.: 11/841,534

(22) Filed: Aug. 20, 2007

(65) Prior Publication Data

US 2008/0056188 A1   Mar. 6, 2008

Related U.S. Application Data

(60) Provisional application No. 60/824,752, filed on Sep. 6, 2006.

(51) Int. Cl.
*H04H 20/71* (2008.01)
*H04W 4/00* (2009.01)
*H04W 72/04* (2009.01)

(52) U.S. Cl. ........ 370/312; 370/330; 370/432; 370/436; 455/426.1; 455/445; 455/451; 455/458; 455/515

(58) Field of Classification Search ............ 370/312, 370/330, 432, 436; 455/426.1, 445, 451, 455/458, 515
See application file for complete search history.

(56) References Cited

U.S. PATENT DOCUMENTS

| | | | | |
|---|---|---|---|---|
| 6,138,034 A * | 10/2000 | Willey | | 455/522 |
| 6,307,846 B1 * | 10/2001 | Willey | | 370/329 |
| 6,477,382 B1 * | 11/2002 | Mansfield et al. | | 455/458 |
| 6,505,058 B1 * | 1/2003 | Willey | | 455/574 |
| 6,639,907 B2 * | 10/2003 | Neufeld et al. | | 370/342 |
| 6,745,056 B2 * | 6/2004 | Wang et al. | | 455/574 |
| 6,826,408 B1 * | 11/2004 | Kim et al. | | 455/466 |
| 6,832,094 B2 | 12/2004 | Butler et al. | | |
| 6,889,067 B2 * | 5/2005 | Willey | | 455/574 |
| 7,006,468 B1 * | 2/2006 | Chen et al. | | 370/330 |
| 7,062,285 B2 * | 6/2006 | Yue | | 455/515 |
| 7,096,024 B2 * | 8/2006 | Sinnarajah et al. | | 455/445 |
| 7,136,650 B2 * | 11/2006 | Diaz Cervera et al. | | 455/445 |
| 7,167,458 B2 | 1/2007 | Agashe et al. | | |
| 7,203,506 B2 * | 4/2007 | Kim et al. | | 455/466 |

(Continued)

FOREIGN PATENT DOCUMENTS

CN            1568089 A      1/2005

(Continued)

OTHER PUBLICATIONS

Soong, A., et al., "Group Broadcast Page for LBC," 3GPP2-C30-20060911-029, Sep. 11, 2006, 8 pages, 3rd Generation Partnership Project 2.

(Continued)

*Primary Examiner* — Alpus H Hsu
(74) *Attorney, Agent, or Firm* — Slater & Matsil, L.L.P.

(57) ABSTRACT

The present invention describes transmitting the page channel, which may comprise a quick page channel and a regular page channel, and the broadcast control channel, which conveys the system information, through the same time-frequency resources across the sectors of a wireless communications network.

38 Claims, 7 Drawing Sheets

U.S. PATENT DOCUMENTS

| | | | |
|---|---|---|---|
| 7,269,414 B2 * | 9/2007 | Patzer et al. | 455/419 |
| 7,328,022 B2 * | 2/2008 | Sinnarajah et al. | 455/445 |
| 7,379,738 B2 * | 5/2008 | Balasubramanian et al. | 455/435.1 |
| 7,424,301 B2 * | 9/2008 | Jou et al. | 455/458 |
| 7,477,916 B2 * | 1/2009 | Sinnarajah et al. | 455/550.1 |
| 7,519,106 B2 * | 4/2009 | Sarkar et al. | 375/146 |
| 7,751,821 B2 * | 7/2010 | Sinnarajah et al. | 455/445 |
| 7,792,074 B2 * | 9/2010 | Chen et al. | 370/329 |
| 7,881,696 B2 * | 2/2011 | Sinnarajah et al. | 455/403 |
| 2005/0186971 A1 | 8/2005 | Ray et al. | |
| 2006/0014551 A1 | 1/2006 | Yoon et al. | |
| 2006/0068813 A1 | 3/2006 | Ku et al. | |
| 2006/0199596 A1 | 9/2006 | Teauge et al. | |

FOREIGN PATENT DOCUMENTS

| | | |
|---|---|---|
| CN | 1656845 A | 8/2005 |
| CN | 1756437 A | 4/2006 |

OTHER PUBLICATIONS

3$^{rd}$ Generation Partnership, Project 2 "3GPP2", "Medium Access Control Layer For Ultra Mobile Broadband (UMB) Air Interface Specification," 3GPP2 C.S0084-002-0, Version 1.0, Apr. 2007, 284 pages.

* cited by examiner

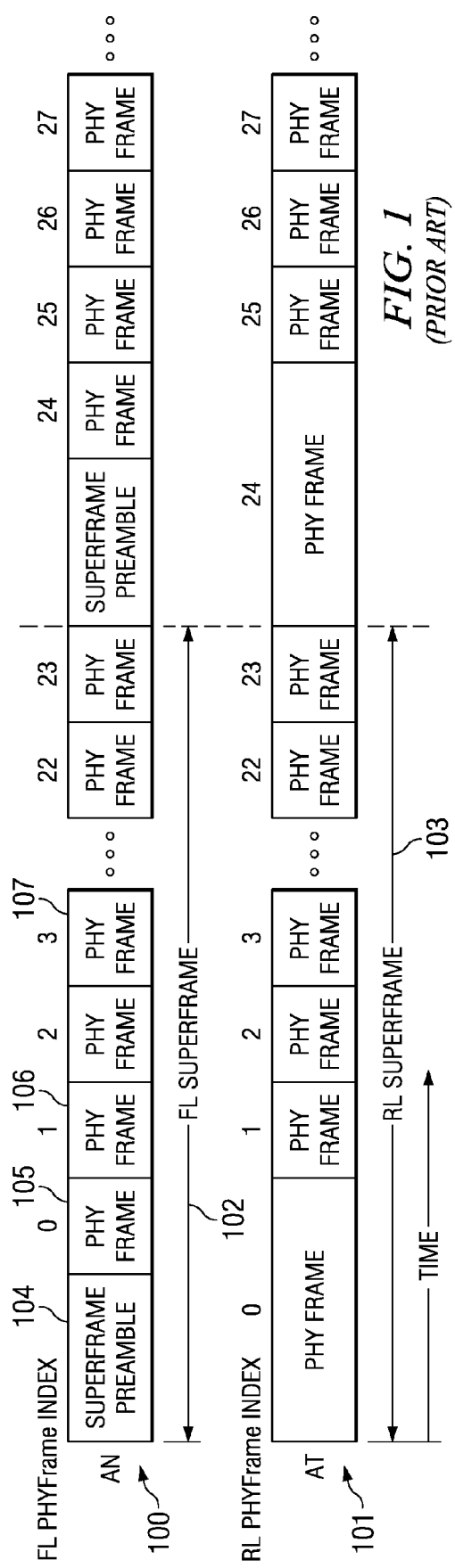
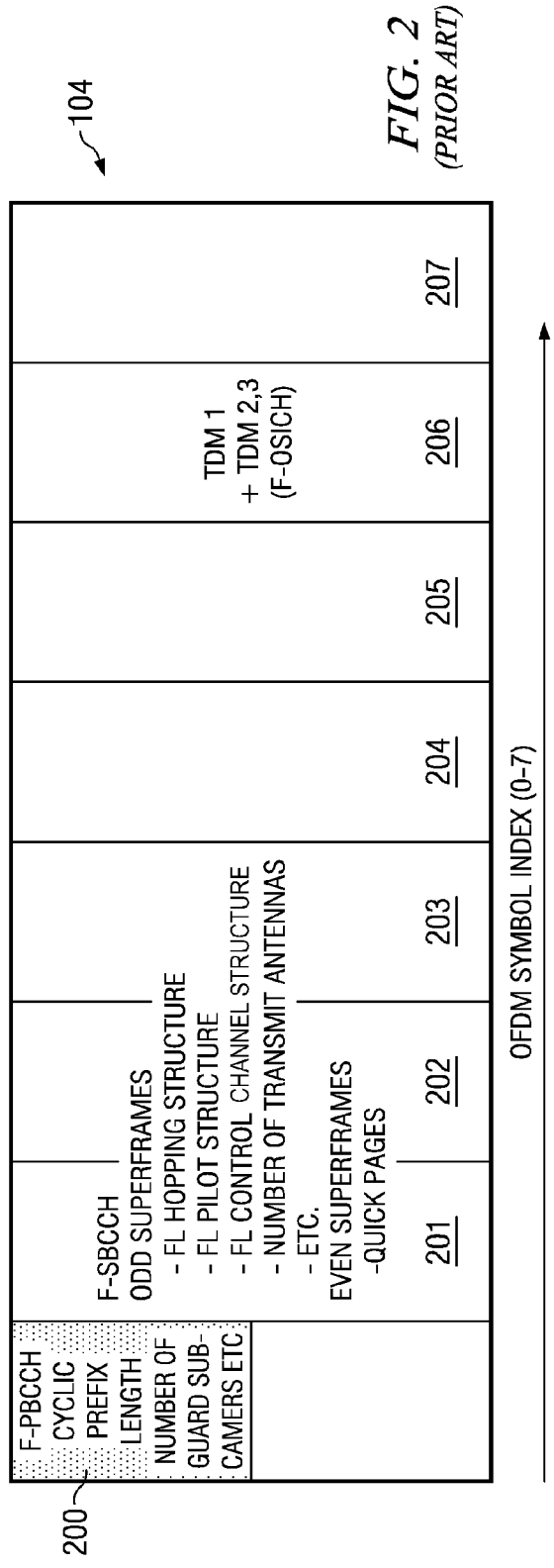
FIG. 1 (PRIOR ART)
FIG. 2 (PRIOR ART)

ODD SUPERFRAME: QPCH AND PBCCH ARE GROUP BROADCAST.
SBCCH AND TDM PILOTS ARE SECTOR BROADCAST.

EVEN SUPERFRAME: PBCCH IS GROUP BROADCAST.
SBCCH AND TDM PILOTS ARE SECTOR BROADCAST.

QPCH IS GROUP BROADCAST. PBCCH, SBCCH AND TDM PILOTS ARE SECTOR BROADCAST.

TRANSMITTING PAGE AND BROADCAST CONTROL CHANNEL THROUGH THE SAME TIME FREQUENCY RESOURCES ACROSS THE SECTORS IN A WIRELESS COMMUNICATIONS SYSTEM

This application claims the benefit of U.S. Provisional Application No. 60/824,752 filed on Sep. 6, 2006, entitled, "METHOD AND APPARATUS FOR TRANSMITTING PAGE AND BROADCAST CONTROL CHANNEL THROUGH THE SAME TIME FREQUENCY RESOURCES ACROSS THE SECTORS IN A WIRELESS COMMUNICATIONS SYSTEM," which application is hereby incorporated herein by reference.

TECHNICAL FIELD

The present invention relates, in general, to a wireless communications system, and, more particularly, to transmitting quick page and regular page channels and the broadcast control channel using the same time-frequency resource across the sectors in a group in a wireless communications system.

BACKGROUND

The 3rd Generation Partnership Project 2 (3GPP2) is a collaboration between telecommunications associations to make a globally applicable third generation (3G) mobile phone system specification within the scope of the International Telecommunication Union's (ITU's) IMT-2000 project. In practice, 3GPP2 is the standardization group for CDMA2000, which is the set of 3G standards based on earlier 2G CDMA technology.

In considering loosely backward compatible mode (LBC) in the 3GPP2 standardization process, the forward link (FL) of an orthogonal frequency division multiplex (OFDM)-based framework was proposed to include an FL superframe consisting of a superframe preamble followed by a certain number of Physical Layer (PHY) frames. FIG. 1 is a diagram illustrating graphical examples of FL superframe 102 and reverse link (RL) superframe 103. FL superframe 102, provided from access network (AN) 100 to AT 101, includes superframe preamble 104 and several subsequent PHY frames 105-107.

FIG. 2 is a diagram illustrating a graphical representation of FL superframe preamble 104. FL superframe preamble 104, as shown, typically consists of eight OFDM symbols, symbols 200-207, for fast fourier transform (FFT) sizes of 512 and above. The first five OFDM symbols, symbols 200-204, in FL superframe preamble 104 are generally used to carry the two physical broadcast channels, namely the forward-primary broadcast control channel (F-PBCCH) and the forward-secondary broadcast control channel (F-SBCCH). An F-PBCCH packet is typically encoded over 16 superframes, and usually occupies ¼ of an OFDM symbol in each superframe preamble. An F-SBCCH packet is typically encoded over a single superframe and usually occupies four ¾ OFDM symbols in each superframe preamble.

The F-PBCCH typically carries system information (e.g., Rev number, CP length, Time and the like), which usually stays the same throughout the entire deployment region. The F-SBCCH channel is typically used to broadcast quick page (QP) messages in even superframes and to broadcast sufficient information, such as the information on the hopping patterns, the pilot structure, the control channel structure, and the configuration of the transmit antennas, to enable the mobile station to demodulate the traffic frames, in odd superframes. Also, the F-SBCCH channel usually contains some fields that have a tendency to change quickly, such as interference level (IoT) on the reverse-data channel (R-DCH) and LoadControl (2 bits for allowed access class).

As various access terminals (ATs), mobile devices, or the like travel through different sectors defined by various access networks (ANs), a base station of the AN does not typically know where ATs are within the sector during AT idle time. In order to maintain proper management of the AN sector, paging is used to keep track of idle ATs within the sector. Paging is the process by which the AN initiates a connection with an idle AT, such that the AT wakes to listen to the FL traffic. The AT does this wake-and-listen only at certain negotiated time intervals in order to conserve local AT resources. A page is typically transmitted to ATs using QuickPage messages on the F-SBCCH and/or Page messages on the Forward Traffic Channel (FTC).

The quick paging channel is usually transmitted every even superframe on F-SBCCH. In OFDM networks, the quick page may be transmitted in single frequency network (SFN) mode by sectors belonging to the same quick paging group. It is usually accompanied by SFN transmission of broadband pilots to provide better forward-quick page channel (F-QPCH) performance at the cell edges in order to help reduce interference in interference limited scenarios. This scheme generally gets full diversity advantage in both slow and fast fading.

Regular pages are usually carried on the forward-data channel (F-DCH), and can be sent in an SFN mode. This regular page message transmission channel is typically scheduled by a forward link assignment message (FLAM) in a shared control channel (SCCH), which is usually scrambled by a broadcast media access control identification (MAC ID) that is commonly known to all the ATs. The FLAM typically indicates the channel resource ID, modulation and coding scheme (MCS), and duration of the page message.

Each sector in the access network also broadcasts various overhead messages periodically to advertise the system parameters to all the ATs. For example, the ExtendedChannelInfo block is one type of overhead message defined in the Overhead Message Protocol in 3GPP2 air interface standards. These overhead messages are usually carried on a logical broadcast channel which is carried on the physical F-DCH in the traffic frames, PHY frames 105-107 (FIG. 1). This logical broadcast channel is differentiated from the regular traffic channel by being scheduled by a FLAM in the SCCH that is scrambled by a broadcast MAC ID commonly known to all the ATs. This logical broadcast channel is referred to as a broadcast channel in the following sections to differentiate it from the two physical broadcast channels, namely F-PBCCH and F-SBCCH, in the preamble 104 as described above. Typically, each sector broadcasts its overhead messages independently. Therefore, it is not necessary that this logical broadcast channel be transmitted in SFN fashion.

As noted above, paging channels are employed in wireless networks to page a subscriber station or AT, such as a cellular phone, in order to instruct the subscriber station to connect to the network for service. In conventional systems, the network has only a rough knowledge of a location of a subscriber station, and no knowledge of channel quality in the area of the subscriber station prior to page transmission. Consequently, a page message is typically sent over a wide region (e.g., a plurality of sectors) at low spectral efficiency due to such inadequate information. Thus, typical paging systems employ a paging channel that is transmitted independently from each sector in a paging region, which can be established based on a registration history for the AT. A page can then be transmitted to the AT by sending the paging message from each sector in the region. While such a paging message can be transmitted at approximately the same time, page transmissions from different sectors are typically independent of each other.

One method that has been developed to address this problem is discussed in U.S. Patent Publication No. 2006/0199596 A1, filed Jul. 5, 2005, entitled, "MULTI-SECTOR BROADCAST PAGING CHANNEL." In this method, paging signal strength is improved at or near sector perimeters in a wireless network region by transmitting identical paging waveforms simultaneously from all sectors in the region and permitting over-the-air signal aggregation to combine signal energy near sector perimeters. Waveforms are modulated using an OFDM technique and can be simultaneously transmitted according to predefined transmission resources over a multi-sector broadcast paging channel reserved for such identical waveforms. Cyclic prefix can be added to the identical waveforms to mitigate problems associated with delay spread and/or time-of-arrival differences at or near sector perimeters. However, this technology addresses only the paging channel, which operates on different transmission channels from the quick page channel and some of the broadcast channels. Thus, problems still exist in the overall paging/management system.

SUMMARY OF THE INVENTION

Representative embodiments of the present invention are directed to broadcasting quick page (QP) and regular page (RP) channels in the same time-frequency resource across the sectors in a group in order to achieve macro diversity and therefore better performance of the wireless system.

In accordance with one aspect of the present invention, a method for broadcasting a QP is disclosed. The method includes sending a QP configuration message, QuickPageConfig Message, (including a group broadcast enable message, GroupBroadcastQuickPageEnable, to indicate whether the QP is sent in SFN, a master sector ID, to indicate the scrambling code of a quick paging channel, and the like) in the broadcasting channel so that the ATs may start monitoring the quick paging channel upon receiving this message. The quick page channel (QPCH) together with F-PBCCH, F-SB-CCH, and TDM pilots are arranged so that the QPCH may be sent in the same time-frequency resource across the quick page group. Moreover, the pilot channels are designed to enable convenient channel estimation for sector broadcasting or group broadcasting. An RP configuration message, RegularPageConfig Message, (including a page MAC ID, to generate the scrambling code of the page FLAM (PFLAM), master sector ID, to indicate the scrambling code of the regular page channel, and the like) is also sent in the broadcasting channel so that the ATs may start monitoring the RP channel and the PFLAM, which assigns the regular page channel, upon receiving the RP configuration message. The PFLAM is sent in each individual sector in the group to assign the RP channel.

In accordance with another aspect of the present invention, a method is provided for monitoring access terminals in a wireless communication network made up of a plurality of wireless cells. A QP configuration message is sent in a broadcasting channel. An RP configuration message is also sent in the broadcast channel. A PFLAM is sent in each sector of the group of sectors making up at least a part of each one of the plurality of wireless cells. The PFLAM includes a resource assignment message assigning an RP channel, where each of the PFLAMs is sent according to a time-frequency resource defined by each sector. The RP channel is transmitted using the same time-frequency resource in each sector of the group and carries the RP message that identifies the ATs being paged.

In accordance with yet another aspect of the present invention, a system is provided for monitoring ATs in a wireless communication network made up of a plurality of wireless cells. The system includes means for issuing a QP configuration message in a broadcasting channel to a QP group. The PFLAM, which is scrambled by a page MAC ID, assigns an RP channel to each sector in the QP group. The system further includes means for issuing the PFLAM to each sector of the QP group, where the PFLAM is sent in each sector according to a time-frequency resource defined by that particular sector. The system also provides means for transmitting the RP channel using the same time-frequency resource in each sector of the QP group.

In accordance with another aspect of the present invention, a computer program product is provided having a computer readable medium with computer program logic recorded thereon. The computer program product includes code for transmitting a QP configuration message and an RP configuration message in a broadcasting channel of a wireless communications network. There is also code for scrambling a PFLAM using a page MAC ID, such that the decoding ATs can identify this PFLAM as containing the resource assignment message for a group broadcasted RP. There is also code for transmitting the RP channel using the same time-frequency resource in each sector of a QP group, while code for transmitting the PFLAM in each individual sector is provided according to a different time-frequency resource defined by each sector of the QP group. Thus, while the PFLAM assigning the RP channel is transmitted using a different time-frequency resource in each sector, it still points to the RP channel which is sent in each sector of the QP group at the same time-frequency resource.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 illustrates the superframe structure in the framework proposal for loose backward compatible mode in 3GPP2;

FIG. 2 illustrates the FL preamble structure in the framework proposal for LBC mode in 3GPP2;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 3:
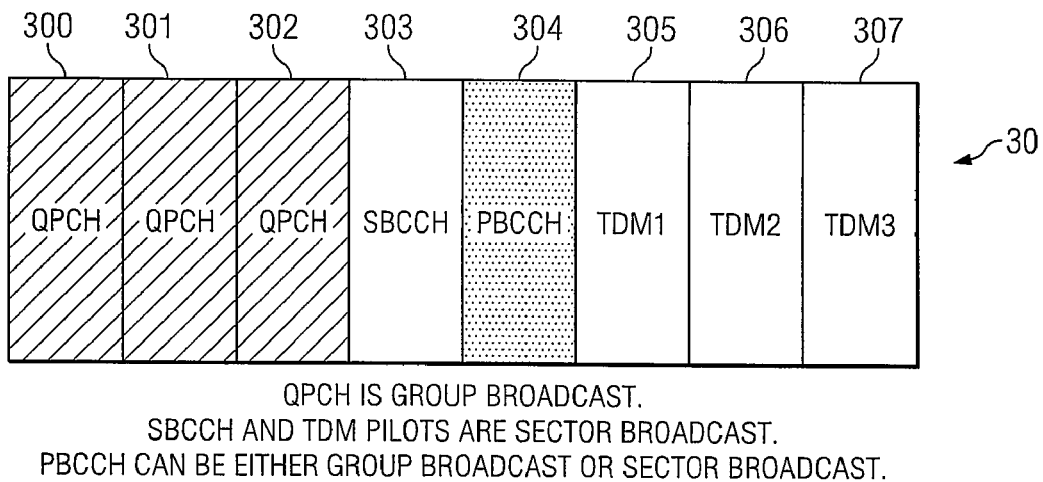
FIG. 3 illustrates an example of the FL preamble structure in a communications system configured according to one embodiment of the present invention.

Turning now to FIG. 3, a graphical representation of superframe preamble 30 configured according to one embodiment of the present invention is illustrated. The eight symbols, symbols 300-307, of superframe 30 may be a combination of channels selected from the four channels: QPCH, PBCCH, SBCCH, and TDM pilot channel, presented in superframe preamble 30. These channels can be multiplexed by TDM, FDM or the combination of TDM and FDM. The QPCH are always group broadcasted while the SBCCH are always sector broadcasted. Symbols 300-302 comprise QPCH, which are illustrated as being group broadcasted. Symbol 303 comprises SBCCH, which is illustrated as being sector broadcasted. Symbol 304 comprises PBCCH, which may be either group or sector broadcasted, depending on the selected embodiment. Symbols 305-307 comprise TDM-1-TDM-3, which are considered to be sector broadcasted even though TDM channels are broadcasted according to convention.

The channels referred to with regard to FIG. 3, i.e., QPCH, PBCCH, SBCCH, and TDM, are referred to using the general channel name. Above, a distinction was made to designate a forward link channel, i.e., F-PBCCH, F-SBCCH, and the like. It should be noted that the 'F' only provides a link direction and does not mean, for example, that an F-PBCCH is not referring to the same type of channel as a PBCCH.

It should be noted that superframe preamble 30 does not have to have all eight symbols, nor is it required to have each of the four channels. Superframe preamble 30 may have, for example, three QPCH, as illustrated, or, in alternative embodiments, may have none.

It should further be noted that performance and cost of the network implemented using the various embodiments of the present invention are generally controlled by the specific combinations of the four channel types in the superframe preambles. Examples of additional and/or embodiments of the present invention are provided further herein.

The QPCH carries the QP information, such as the number and identifiers of the paged users, and is transmitted in SFN mode through the QP group sectors, which means that the group member sectors transmit the same waveform of the QP using the same time-frequency resource. As an alternative, the diversity transmission scheme may be adopted among the group members, such as cyclic delay diversity and the like. To enable the group broadcast, the scrambling code, hopping pattern, if any, and the group embedded dedicated pilot, which should be known to each of the ATs in the quick paging group zone, should apply to QPCH.

In selected embodiments, this information could be carried along with the system information. For example, one sector in the QP group may be selected as the master sector. Its sector scrambling code may then be used as the scrambling code for the QPCH transmitted through each sector of the QP group. Instead of transmitting this information through page information messages, a master sector ID may be placed in a system message, such as ExtendedChannelInfo block, which is broadcasted on air every 16 superframes. Moreover, for the convenience of the roaming mobiles, this information also could be put on the neighboring list of sector information so that the AT could know the quick paging configuration of the neighboring sector.

In selected additional and/or alternative embodiments of the present invention, a group scrambling code may be assigned, which is indicated by a Group ID or group pseudo noise (PN) code. This group scrambling code may or may not be related to the sector scrambling code. However, there should be a relationship between such a group scrambling code and a second scrambling code, such that mapping may be performed between a sector ID or PN and a group ID or PN.

A dedicated pilot is embedded in the QPCH and is transmitted in the same time-frequency resource across the sectors in the group. Because OFDM transmissions exhibit a soft combine feature, the ATs do not need to distinguish the signals from each individual member in the group. Instead, the ATs can estimate the combined channel directly from the dedicated pilots embedded in the QPCH and then decode the QPCH thereafter.

The SBCCH carries the system information needed for the AT to read the forward traffic channel (FTC) as well as some fields that may change quickly, such as Interference level on R-DCH (IoT) and LoadControl (for an allowed access class). Furthermore, SBCCH is sector broadcasted. Because it is a sector-wide broadcast, the ATs estimate the individual channel from the sector and regard the signal from other sectors as interference. Therefore, to ensure the channel estimation, the TDM pilot, which facilitates the initial acquisition procedure of ATs, should be applied to each individual sector and may be power boosted to alleviate the interference.

The PBCCH carries system information, which is the same across the deployment group. Therefore, the PBCCH may be group broadcasted. However, to simplify the acquisition procedure and network planning, it is customary to broadcast PBCCH in every sector. Decoding a group broadcasted PBCCH includes much of the same information used in decoding sector broadcasted PBCCH, such as the PBCCH position and MCS. Additional conditions and information for decoding a group broadcasted PBCCH include, for example: (1) the scrambling code, i.e., the group PN; and (2) the group channel estimation.

After acquisition of the TDM pilots, the AT obtains the time and frequency synchronization, as well as the sector ID, also sometimes known as the pilot PN. However, because the PBCCH is broadcasted in a group of several sectors, the PBCCH is scrambled by the group scrambling code, i.e., the group PN. Each of the ATs in the group knows the sector PN of the current sector. As noted above, a relationship exists between the sector PN and the group PN. Therefore, the AT should be able to determine the group PN by mapping the known sector PN to the group PN. In selected embodiments and networks, this mapping scheme from sector PN to group PN is defined in the network standard. The dedicated TDM pilot is further embedded in this channel so that the AT may estimate the composite channel in order to accomplish the decoding.

It should be noted that in selected additional and/or alternative embodiments or circumstances, when the PBCCH is broadcasted over the entire deployment region, no scrambling code is necessary.

Figure 4A:
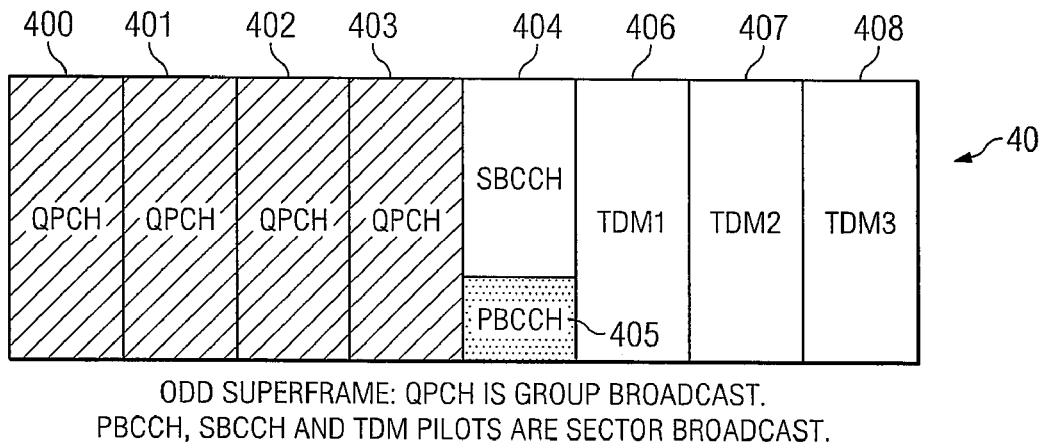
FIG. 4A illustrates an example of the FL preamble structure in an odd superframe in a communications system configured according to one embodiment of the present invention.

Turning now to FIG. 4A, a graphical representation of odd superframe preamble 40 is illustrated according to one embodiment of the present invention. Odd superframe preamble 40 carries four symbols of QPCH 400-403, 0.75 symbols of SBCCH 404, 0.25 symbols of PBCCH 405, and three symbols of TDM pilots 406-408. The SBCCH in odd superframes only carries the control information that may change quickly, such as IoT and Loadcontrol, so that it may be carried on a small amount of resource, e.g., 0.75 symbol SBCCH 404, and achieves certain reliability. QPCH symbols 400-403 and their embedded group-dedicated pilots are broadcasted through the QP group in SFN mode. SBCCH 404, PBCCH 405 and TDM pilots 406-408 in this embodiment are sector broadcasted as well as their respective embedded sector pilots. Therefore, in odd superframe preamble 40, QPCH symbols 400-403 are group broadcasted and the last 4 OFDM symbols, SCCH symbol 404, PBCCH symbol 405, and TDM symbols 406-408, are sector broadcasted.

Figure 4B:
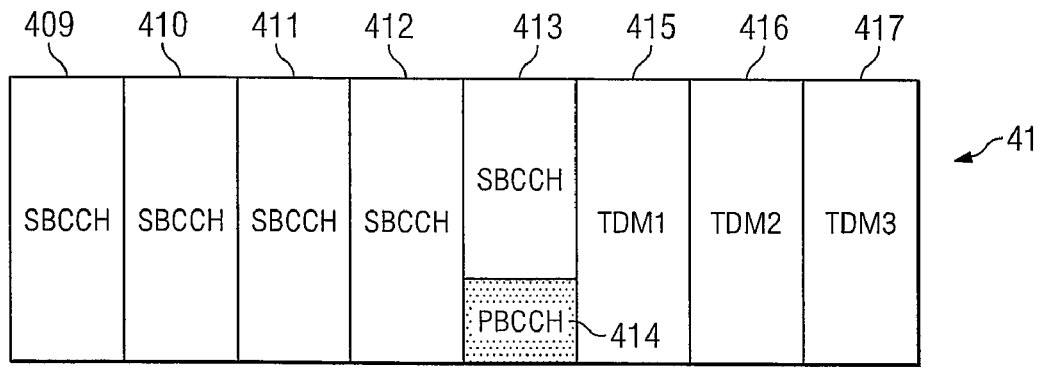
FIG. 4B illustrates an example of the FL preamble structure in an even superframe in a communications system configured according to one embodiment of the present invention.

FIG. 4B illustrates a graphical representation of even superframe preamble 41 configured according to one embodiment of the present invention. Superframe preamble 41 carries 4.75 symbols of SBCCH 409-413, 0.25 symbols of PBCCH 414, and three symbols TDM pilots 415-417. Besides the quick control information, SBCCHs 409-413 in even superframe carries system information enabling ATs to monitor the forward link traffic channel. Therefore, in even superframe preamble 41, all the OFDM symbols, symbols 409-417, are sector broadcasted.

It should be noted that the position, number, and content of the channel positions and symbols depicted in FIGS. 4A and 4B and the remaining figures are only for illustration and can be easily generalized to any other alternatives.

According to an additional and/or alternative embodiment of the present invention, since PBCCH is the same across the entire deployment region, the PBCCH could be group broadcasted. As noted above, there are two conditions to acquiring the PBCCH: (1) knowing the scrambling code, i.e., the group PN; and (2) knowing the group channel estimation. After acquisition of TDM pilots, the AT obtains the time and frequency synchronization as well as the sector ID, also known as the pilot PN. However, the PBCCH is scrambled by the group PN. Therefore, the AT should be able to find the group PN from the current sector PN, also as noted above.

Figure 5A:
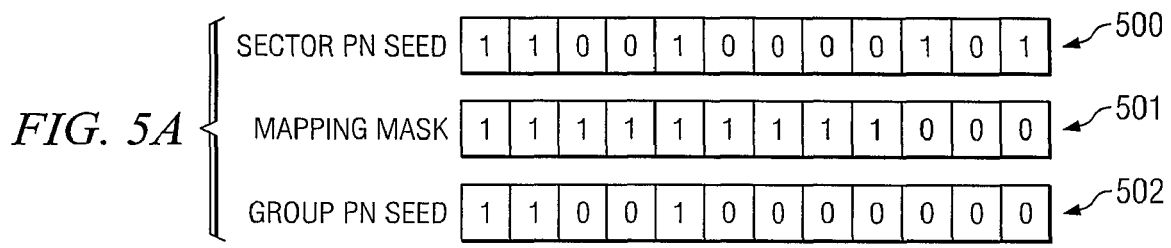
FIG. 5A illustrates an example of mapping the sector pseudo noise (PN) seed to the group PN seed by the seed mask in a communications system configured according to one embodiment of the present invention.

FIG. 5A is a diagram illustrating mapping mask 501 used to map sector PN seed 500 into group PN seed 502. Mapping mask 501 masks several bits of sector PN seed 500 to form group PN seed 502. Here, sector PN seed 500 is 12 bits. Mapping mask 501 masks the three least significant bits (LSB) to zero to get group PN seed 502. In this example, when the operator conducts network planning and assigns the sector PN, the group PN can be assigned with the three bit LSB zeros. Then, the sector PN may be assigned based on the group PN, that is, keep the 9 bit most significant bits (MSB) of the sector PN the same as the group PN. Therefore, within one group, there may be up to eight different sectors.

It should be noted that additional and/or alternative mapping schemes may also be used. This mapping from sector PN seed 500 to group PN seed 502 imposes restrictions on network planning. However, the downside is affordable because of the large number of available sector PNs. The combined channel can be measured from the embedded group pilot in the PBCCH.

Figure 5B:
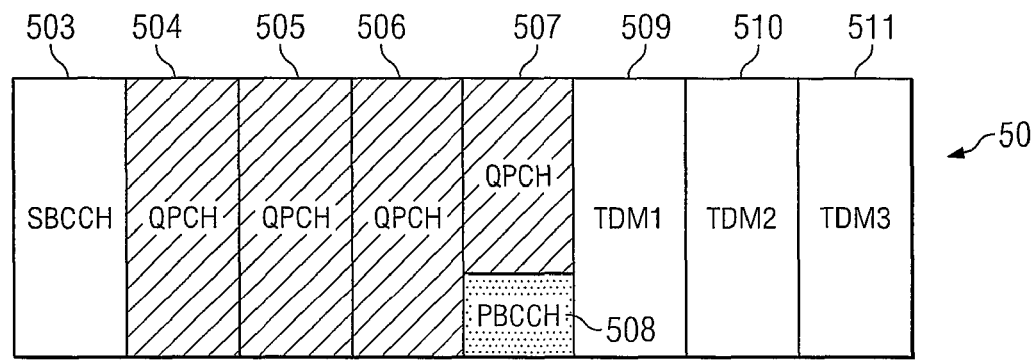
FIG. 5B illustrates an example of the FL preamble structure in an odd superframe in a communications system configured according to one embodiment of the present invention.

Turning now to FIG. 5B, a graphical representation of odd superframe preamble 50 is illustrated configured according to one embodiment of the present invention. Odd superframe preamble 50 carries 3.75 symbols of QPCH 504-507, one symbol of SBCCH 503, 0.25 symbols of PBCCH 508, and three symbols of TDM pilots 509-511. SBCCH 503 in odd superframe preamble 50 only carries the control information that may change quickly, so that it may be carried on a small amount of resource, e.g., 1 symbol, and achieves certain reliability. SBCCH 503 is sector broadcasted. QPCHs 504-507 and PBCCH 508 are broadcasted through the QP group sectors in SFN. To facilitate the group transmission, the group dedicated pilot is embedded in QPCHs 504-507 and PBCCH 508. QPCH 507 and PBCCH 508 are combined to be group broadcasted. Therefore, in odd superframe preamble 50, the four symbols of QPCHs 504-507 and PBCCH 508 are group broadcasted and the other four symbols, SBCCH 503 and TDMs 509-511 are sector broadcasted.

In this example embodiment, the sector specific pilot can apply to SBCCH symbol 503, from which the AT can decode SBCCH 503 by estimating the air link channel from each individual sector of the group. However, the group specific pilot can apply to QPCHs 504-507 and PBCCH 508 symbols, from which the AT can decode the group broadcast channel by estimating the composite air link channel.

Figure 5C:
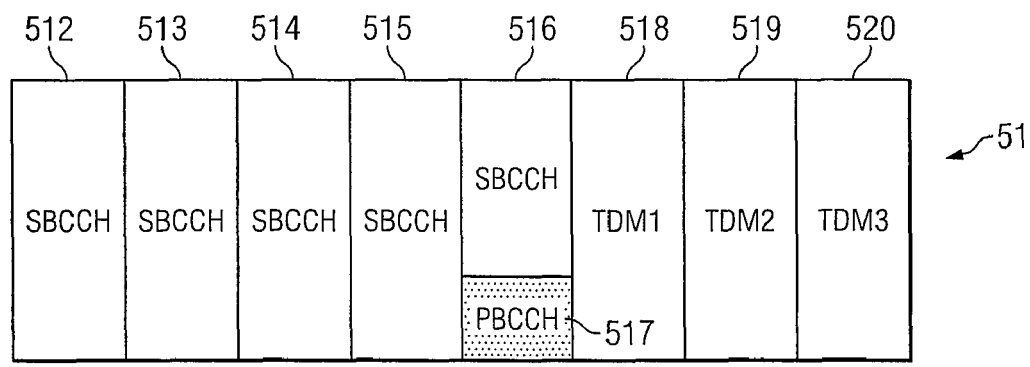
FIG. 5C illustrates an example of the FL preamble structure in an even superframe in a communications system configured according to one embodiment of the present invention.

Turning now to FIG. 5C, a graphical representation of even superframe preamble 51 is illustrated according to one embodiment of the present invention. Even superframe preamble 51 carries 4.75 symbols of SBCCHs 512-516, 0.25 symbols of PBCCH 517, and three symbols of TDM pilots 518-520. SBCCH 512-516 in even superframe preamble 51 carry system information for AT to monitor the forward link traffic channel besides the quick control information. To be consistent with odd superframe preamble 50 (FIG. 5B), PBCCH 517 is group broadcasted. Therefore, in even superframe preamble 51, all the OFDM symbols except the 0.25 symbol of PBCCH 517 are sector broadcasted.

In this example embodiment, the sector specific pilot can apply to SBCCH symbols 512-516, from which the AT can decode the SBCCH by estimating the air link channel from each individual sector. However, the group specific pilot can apply to PBCCH symbols 517, from which the AT can decode the group broadcast channel by estimating the composite air link channel.

Figure 6A:
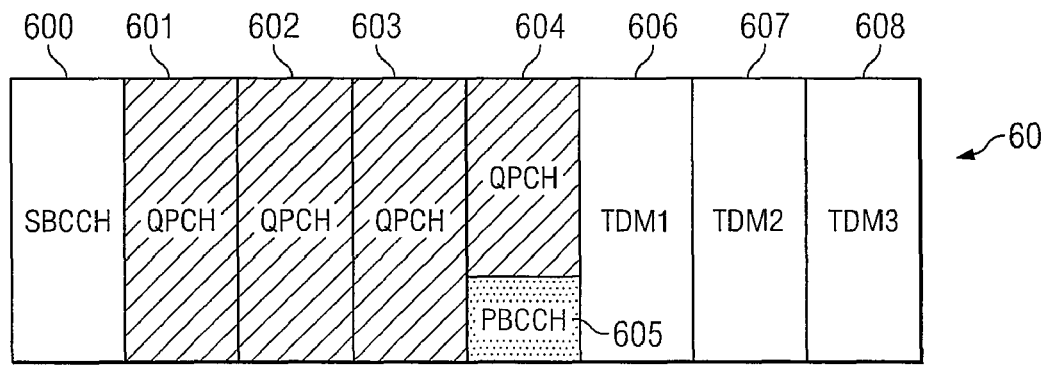
FIG. 6A illustrates an example of the FL preamble structure in an odd superframe in a communications system configured according to one embodiment of the present invention.
Figure 6B:
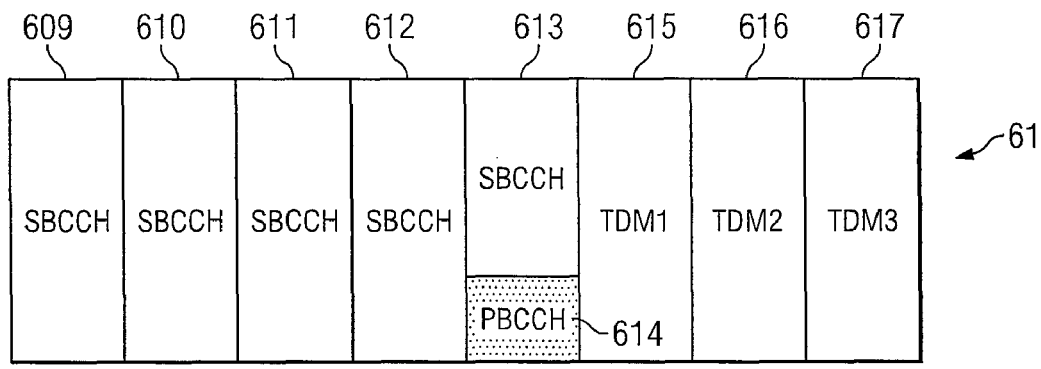
FIG. 6B illustrates an example of the FL preamble structure in an even superframe in a communications system configured according to one embodiment of the present invention.

FIGS. 6A and 6B are graphical representations of odd superframe preamble 60 and even superframe preamble 61 configured according to one embodiment of the present invention. PBCCH 605 is group broadcasted in odd superframe preamble 60, while PBCCH 614 is sector broadcasted in even superframe preamble 61. Thus, there is no group broadcasting symbol in even superframe preamble 61. However, because of the difference between sector and group transmission in terms of scrambling code and pilot pattern, the AT has to know the transmission scheme. A variety of solutions may be used to ensure that the AT knows the transmission scheme. For example, the AT may conduct blind detection. The AT attempts to detect both sector and group broadcasting. When the attempt is successful, the AT has detected the correct one.

Alternatively, the TDM pilots may carry the information about the current broadcasting scheme. For example, in odd superframe preamble 60, TDM pilots 606-608 may be scrambled using Walsh(0,2), and, in even superframe preamble 61, TDM pilots 615-617 may be scrambled using Walsh(1,2), where Walsh(0,2) means the first sequence of a second order Walsh code. By this means, the AT attempts Walsh(0,2) and Walsh(1,2) in the acquisition stage in order to determine which superframe has been detected. Once the AT successfully detects either the even or odd superframe it has received, the AT knows the broadcasting scheme of either PBCCH 605 or 614 and can decode accordingly.

In yet another alternative implementation, TDM pilots 606-608 and 615-617 may carry one bit to indicate the transmission scheme of PBCCH 605 or 615. TDM pilots 606-608 and 615-617 may carry generalized chirp-like (GCL) sequences and the sector PNs. Therefore, when the AT detects one set of GCL sequences, it may imply one transmission scheme while detecting a different set of GCL sequences may imply the other transmission scheme. Alternatively, reading one sector PN may imply one transmission scheme while another sector PN implies the other transmission scheme. In this case, the network changes the GCL sequence or sector PN according to the current transmission scheme, of the PBCCH. Moreover, after detecting the GCL sequence or sector PN, the AT knows the transmission scheme of the PBCCH accordingly.

Figure 7:
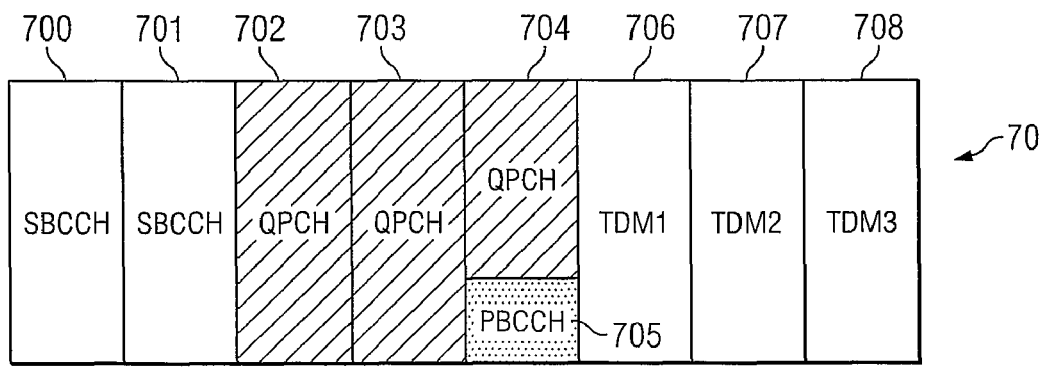
FIG. 7 illustrates an example of the FL preamble structure in a communications system configured according to one embodiment of the present invention.

Turning now to FIG. 7, a graphical representation of superframe preamble 70 configured according to one embodiment of the present invention is illustrated. Instead of switching superframe configurations for even and odd superframes, PBCCH 705, SBCCHs 700-701, QPCHs 702-704, and TDM pilots 706-709 are present in every superframe in the illustrated embodiment. QPCHs 702-704 and PBCCH 705 are group broadcasted, while SBCCHs 700-701 and TDM pilots 702-704 are sector broadcasted. QPCHs 702-704 and SBCCHs 700-701 may or may not be encoded independently in any given superframe.

In selected embodiments where there is independent encoding, because the number of the modulated OFDM symbols decreases, the channel has to also decrease the payload size to achieve similar performance. Therefore, SBCCHs 700-701 and QPCHs 702-704 divide their respective original content in half and transmit each half in each superframe. For example, the original payload for QPCHs 702-704 is 35 bits, three bits for the number of pages and 32 bits for the AT/user identifiers. In this specific example, QPCHs 702-704 can handle an 18 bit payload, two bits for the number of pages and 16 bits for the identifiers. SBCCHs 700-701 also can handle an 18 bit payload. In the even superframe, SBCCHs 700-701 send some fields and the odd superframe sends the others.

In selected additional and/or alternative embodiments where the channels are jointly encoded across the superframes, the payload of QPCHs 702-704 and SBCCHs 700-701 does not need to change. The coded symbols will be spread out to the consecutive preambles and the ATs may take advantage of the soft combine and the time diversity features on the cost of processing time. In this case, the ATs know the beginning of the encoded packets of QPCHs 702-704 and SBCCHs 700-701 because the ATs know the superframe sequence number.

Figure 8:
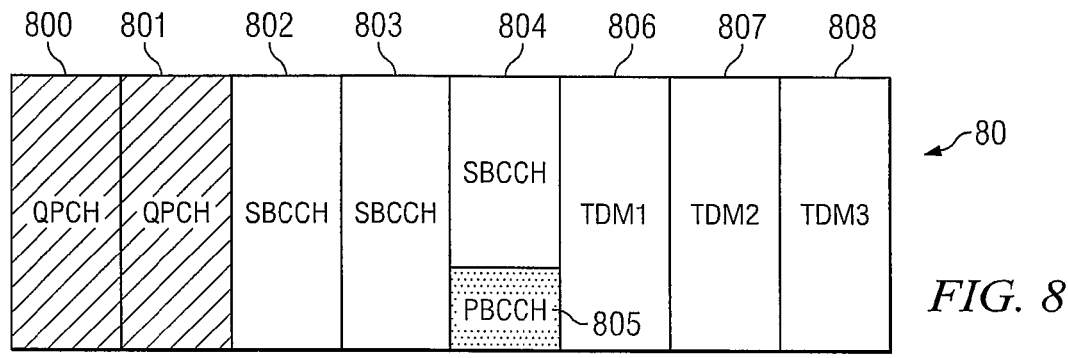
FIG. 8 illustrates an example of the FL preamble structure in a communications system configured according to one embodiment of the present invention.

Turning now to FIG. 8, a graphical representation of superframe preamble 80 configured according to one embodiment of the present invention is illustrated. As illustrated in FIG. 7, every superframe preamble in the currently illustrated embodiment includes PBCCH 805, SBCCHs 802-804, QPCHs 800-801, and TDM pilots 806-808. However, in the currently illustrated embodiment, QPCHs 800-801 are group broadcasted while PBCCH 805, SBCCHs 802-804, and TDM pilots 806-808 are sector broadcasted.

It is another aspect of the various embodiments of the present invention to provide group broadcast of the RP channel. The configuration message for the RP channel, RegularPageConfig Message, includes the page MAC ID, which is used to generate the scrambling code of the page FLAM (PFLAM), and the master sector ID, which is used to indicate the scrambling code of the RP channel, and the like. Selected embodiments of the present invention make this RP channel configuration message available before the ATs even start monitoring the RP channel and the PFLAM, which assigns the RP channel. Therefore, as suggested above with regard to the QP configuration message, the RegularPageConfig Message may be put into system information, such as the ExtendedChannelInfo block, which is the system broadcasting message on air every, e.g., 16 superframes. Moreover, also similar to the suggested treatment of the QP configuration message, for the convenience of the roaming mobiles, this information also could be put on the neighboring list of sector information so that the ATs will know the regular paging configuration of the neighboring sector.

The FLAM is used to indicate the FL traffic channel assignment information, such as the channel ID, the channel type, the channel duration, the MCS, and the like. After acquiring the FLAM, the AT is able to decode the traffic channel accordingly. The RP message is carried on the traffic channel. Therefore, it needs a FLAM (also known as page FLAM, PFLAM) to indicate the exact channel for the ATs. The PFLAM can be scrambled by a special MAC ID so that the ATs know that the channel this FLAM points to is a page message carrier. This special MAC ID may be predefined in the wireless standard or may be assigned through the system message. The AT then uses this special MAC ID as the scrambling code to decode the PFLAM.

It should be noted that additional and/or alternative methods may be used other than the special MAC ID. One such alternative example is to place a page indicator inside the PFLAM. When this page indicator is read, the active AT may ignore the page message, which saves power and decoding time of the active user.

Although the RP is preferred to be transmitted in the same time-frequency resource across the sectors in the paging group in order to achieve the macro diversity gain, the PFLAM to indicate an RP channel is usually sent in the individual sector under consideration of the individual sector's traffic channel policies. That is, the PFLAM is not necessarily sent in the same time-frequency resource across the individual sectors in the group.

Figure 9A:
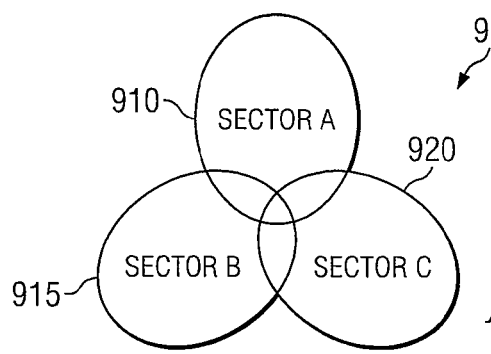
FIG. 9A illustrates an example of the page group consisting of three sectors in a communications system configured according to one embodiment of the present invention.
Figure 9B:
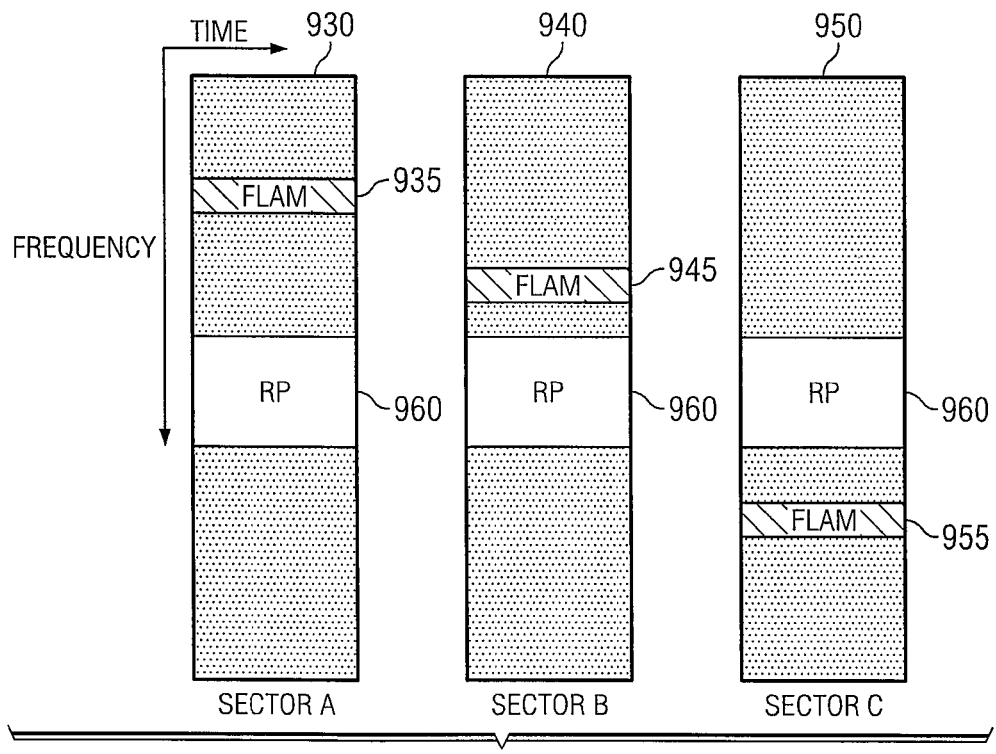
FIG. 9B illustrates an example of the individual sector PFLAM and group broadcast RP in a communications system configured according to one embodiment of the present invention.

FIG. 9A is a diagram illustrating cell 90 having sectors A-910, B-915, and C-920 and providing an environment in accordance with the principles of an embodiment of the present invention. Sectors A-910, B-914, and C-920 constitute a page group. FIG. 9B is a chart illustrating the time-frequency block of the transmission source for each sector in the page group, blocks 930, 940, and 950. The group broadcasted page message, depicted as block 960, is transmitted through the same time-frequency resource from the three sectors A-910, B-915, and C-920. However, while the three PFLAMs, PFLAMs 935, 945, and 955, carry the same channel assignment message for this group broadcasted page, i.e., block 960, they are independently transmitted in the physical traffic channels for each sector, respectively. The ATs in each sector can then find the RP channel through the PFLAM in the sector. For example, the ATs in sector B-915 detect PFLAM 945. They know that this PFLAM is for a group broadcasted page because of its special page MAC ID. Then, from the information inside this PFLAM, the ATs are able to decode the group broadcasted page message, i.e., block 960.

It should be noted that transmitting the PFLAM in the same time-frequency resource across the sectors in the group is feasible and may be implemented if the costs for such a group broadcasting of PFLAM is considered affordable by the network provider.

It should further be noted that some of the parameters and information for a page and the PFLAM may be predefined in the network standards in order to save message overhead. Such parameters and information that could be placed in the standards include the special MAC ID for page, the channel type, the channel duration, the MCS, and the like. The channel resource used for the RP may be predefined too. In such cases, the PFLAM to indicate a group broadcasted RP will not be necessary and the scheduler will guarantee the time-frequency resource available for the group broadcasted RP across the sectors in the group.

In operation of the above group broadcasted features, the ATs conduct corresponding operations. For example, after acquiring the TDM pilot, the AT knows the transmission scheme of the PBCCH and is, therefore, able to decode the PBCCH info. The transmission scheme includes whether or not the PBCCH is group broadcasted, the pilot pattern, scrambling code, and the like. The PBCCH carries the basic system parameters, such that the ATs can access the system to retrieve all of the system overhead messages, including the configuration of quick paging and RP in the extended channel information message, ExtendedChannelInfo. From these configurations, the AT knows whether these channels are group broadcasted or not and how to estimate the channel accordingly.

In embodiments and circumstances where the channel resources for the RP were not predefined, the AT would also need to know the configuration information with regard to the PFLAM. This PFLAM configuration information would include the special Page MAC ID and whether or not the PFLAM is group broadcasted. In accordance with the normal paging procedure, the AT monitors the QP in preamble according to the particular transmission scheme of the QP channel, and, once the QP message is found, the AT monitors the PFLAM to find the parameter to decode the RP channel.

To shorten the re-page interval, the quick re-page has been introduced. If the network has not heard from a paged AT for certain length of time, the network will automatically re-page that AT. It should be noted that the principles of the various embodiments of the present invention would also apply to quick re-page.

Figure 10:
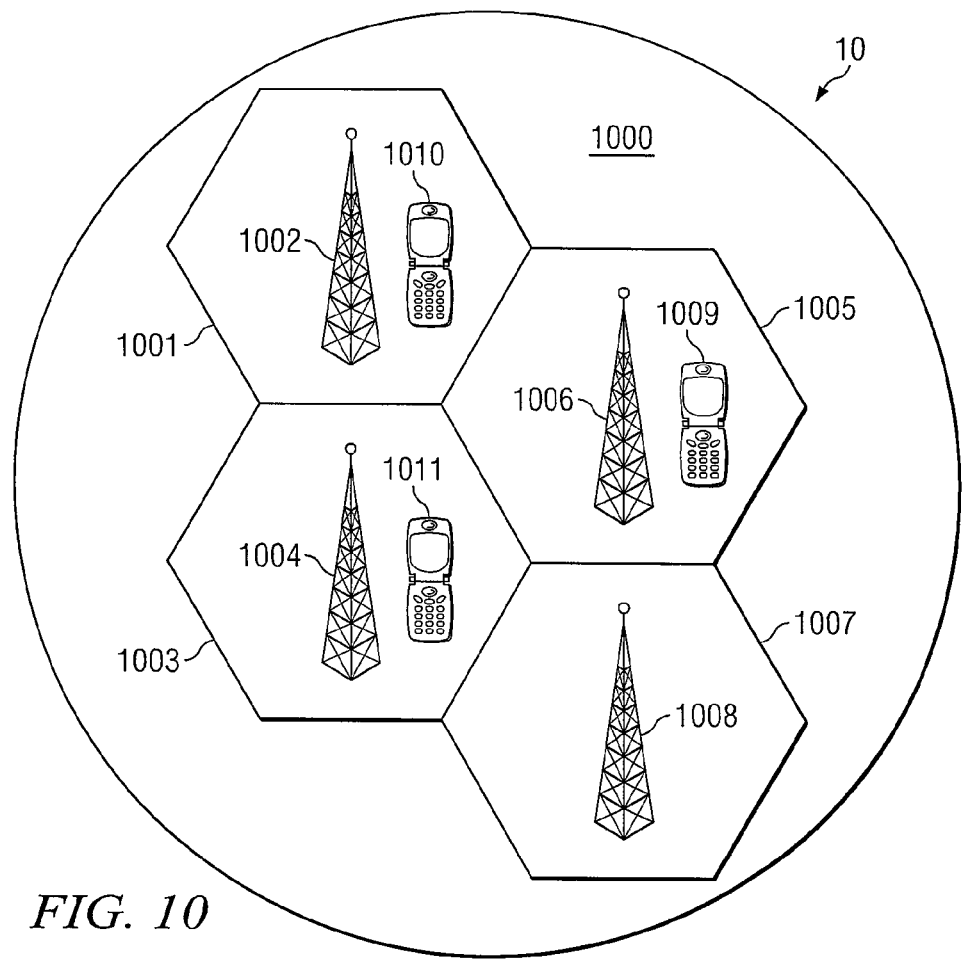
FIG. 10 illustrates a high-level system overview of a mobile network providing an environment for a communications system configured according to one embodiment of the present invention.

FIG. 10 is a block diagram illustrating region 1000 of wireless network 10. Region 1000 represents any service area and can be made up from any number of sub-regions, or sectors, each of which can further comprise at least one base station (e.g., tower, transmitter, or the like) from which a communication signal can be transmitted to provide service to the sector. For example, sector 1005 includes base station 1006 that can transmit a signal to AT 1009.

The principles and features of the various embodiments of the present invention are implemented through wireless network 10. The features and functionality for generating the quick page, page, PFLAM, and the like, are each handled at base stations, such as base stations 1002, 1004, 1005, and 1008, within sectors 1001, 1003, 1005, and 1007 of region 1000. Computers and computer equipment at base stations 1002, 1004, 1005, and 1008 operate software that controls the formation of the various waveforms for transmission over sector antennae for the ATs, such as ATs 1009-1111, which may comprise devices, such as mobile phones, wireless pagers, digital personal assistants (PDAs), or the like. This computer equipment includes and/or is connected to antenna controllers which control how the various waveforms and signals are transmitted over region 1000.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic media, RF links, and the like. The code segments may be downloaded via computer networks such as the Internet, Intranet, and the like.

Figure 11:
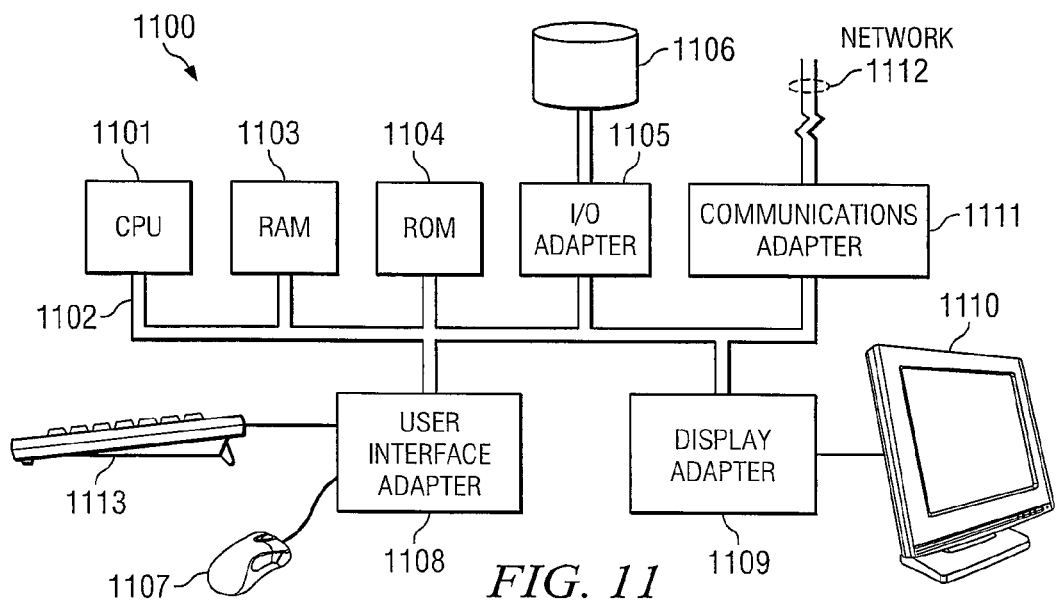
FIG. 11 illustrates a computer system configured to operate according to one embodiment of the present invention.

FIG. 11 illustrates computer system 1100 adapted to use embodiments of the present invention, e.g., storing and/or executing software associated with the embodiments. Central processing unit (CPU) 1101 is coupled to system bus 1102. CPU 1101 may be any general purpose CPU. However, embodiments of the present invention are not restricted by the architecture of CPU 1101 as long as CPU 1101 supports the inventive operations as described herein. Bus 1102 is coupled to random access memory (RAM) 1103, which may be SRAM, DRAM, or SDRAM. ROM 1104 is also coupled to bus 1102, which may be PROM, EPROM, or EEPROM. RAM 1103 and ROM 1104 hold user and system data and programs as is well known in the art.

Bus 1102 is also coupled to input/output (I/O) controller card 1105, communications adapter card 1111, user interface card 1108, and display card 1109. The I/O adapter card 1105 connects storage devices 1106, such as one or more of a hard drive, a CD drive, a floppy disk drive, and a tape drive, to computer system 1100. I/O adapter 1105 is also connected to a printer (not shown), which would allow the system to print paper copies of information such as documents, photographs, articles, and the like. Note that the printer may be a printer (e.g., dot matrix, laser, and the like), a fax machine, a scanner, or a copier machine.

Figure 12:
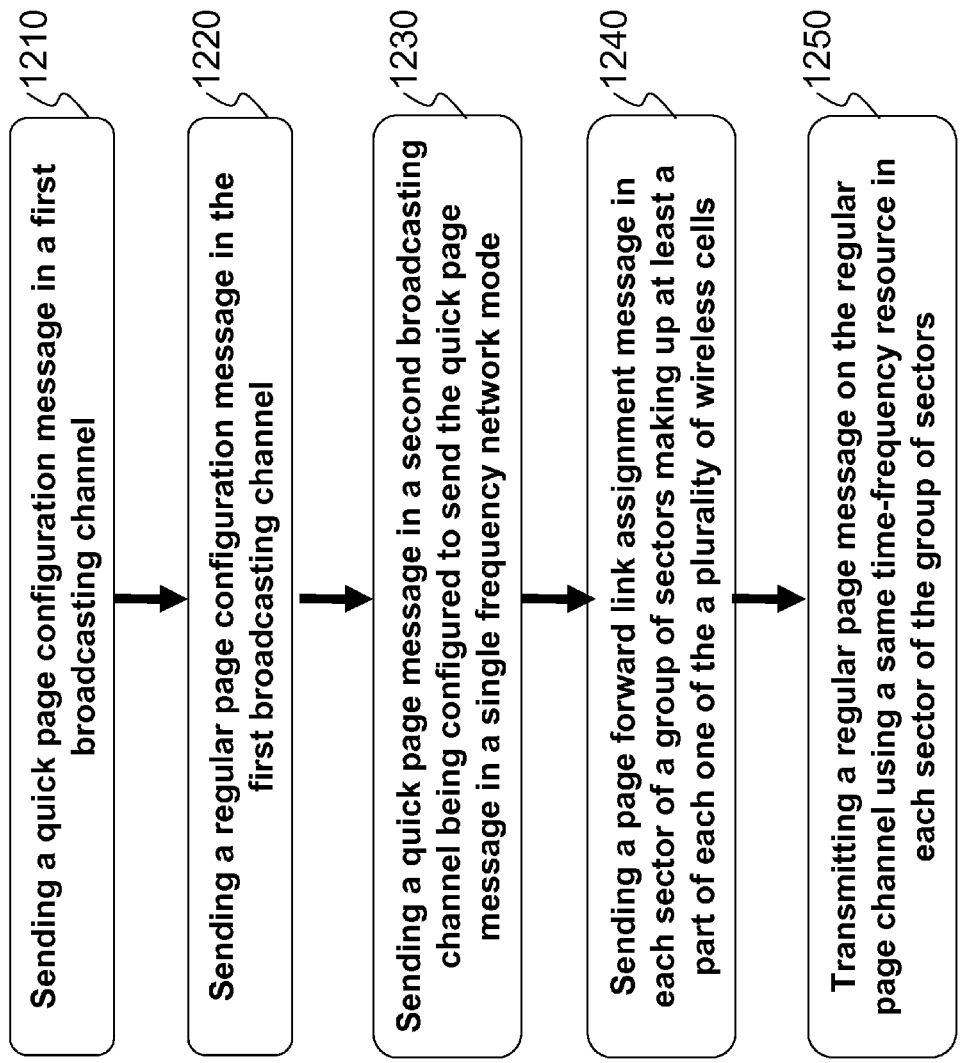
FIG. 12 illustrates a flow chart of monitoring access terminals in a wireless communications network.

FIG. 12 illustrates a flow chart of monitoring access terminals in a wireless communications network having a plurality of wireless cells. In a step 1210, a QP configuration message is sent in a first broadcasting channel. In a step 1220, a RP configuration message is sent in the first broadcasting channel. In a step 1230, a QP message is sent in a second broadcasting channel. The second broadcasting channel may be configured to send the QP message in a single frequency network mode. In a step 1240, a page forward link assignment message (PFLAM) is sent in each sector of a group of sectors. The group of sectors may make up at least a part of each one of the plurality of wireless cells. In addition, each of the PFLAMs is sent according to a time-frequency resource defined by each sector. In a step 1250, a regular page message is transmitted on the regular page channel using a same time-frequency resource.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for monitoring access terminals in a wireless communications network comprising a plurality of wireless cells, said method comprising:
    sending a quick page (QP) configuration message in a first broadcasting channel;
    sending a regular page (RP) configuration message in said first broadcasting channel;
    sending a QP message in a second broadcasting channel, said second broadcasting channel configured to send said QP message in a single frequency network (SFN) mode;
    sending a page forward link assignment message (PFLAM) in each sector of a group of sectors making up at least a part of each one of said plurality of wireless cells, said PFLAM including a resource assignment message assigning an RP channel, wherein each of said PFLAMs is sent according to a time-frequency resource defined by said each sector; and
    transmitting an RP message on said RP channel using a same time-frequency resource in said each sector of said group of sectors.

2. The method of claim 1 wherein said QP configuration message comprises one or more of:
    signaling indicating a scrambling code of a QP channel;
    signaling identifying said each sector of said group of sectors; and
    signaling identifying a group dedicated pilot pattern embedded in said QP channel.

3. The method of claim 2 wherein said QP configuration message is available at one or more of:
    a system overhead message; and
    a neighbor list message.

4. The method of claim 1 wherein said second broadcasting channel comprises one of:
    a group broadcasting channel; and
    a sector broadcasting channel.

5. The method of claim 4 further comprising:
    configuring a link preamble using a combination of up to eight channels, said combination selected from the group consisting of:
    a QP channel (QPCH);
    a prime broadcasting channel (PBCCH);
    a secondary broadcasting channel (SBCCH); and
    a time-division multiplex (TDM) pilot channel.

6. The method of claim 5 further comprising:
    embedding a group dedicated pilot into said group broadcasting channel.

7. The method of claim 6 wherein said group broadcasting channel comprises one of:
    said QPCH; and
    said PBCCH.

8. The method of claim 5 further comprising:
    embedding a sector dedicated pilot into said sector broadcasting channel.

9. The method of claim 8 wherein said sector broadcasting channel comprises said SBCCH.

10. The method of claim 5 further comprising:
    providing a mapping scheme identifying one or more group pseudo noise (PN) codes corresponding to one or more sector PN codes, wherein said one or more group PN codes facilitate group broadcasting of said PBCCH.

11. The method of claim 2 wherein said RP configuration message comprises one or more of
    a page media access control (MAC) ID, said page MAC ID identifying a scrambling code for said PFLAM; and
    signaling indicating a scrambling code for said RP channel.

12. The method of claim 11 wherein said RP configuration message is available at one or more of:
    a system overhead message; and
    a neighbor list message.

13. The method of claim 11 wherein said QP configuration message and said RP configuration message are combined into a single message.

14. The method of claim 1 wherein:
    a scrambling code for a QP channel and said RP channel;
    identification of said each sector of said group of sectors;
    identification of a group dedicated pilot pattern embedded in said QP channel; and
    a page media access control (MAC) ID, said page MAC ID identifying a scrambling code for said PFLAM;
    are defined in a standard according to which said wireless communications network operates.

15. The method of claim 1 further comprising:
    marking said PFLAM to identify said PFLAM to an access terminal (AT) as containing said resource assignment message for said RP message.

16. The method of claim 15 wherein said marking comprises:
    scrambling said PFLAM using a page MAC ID known to said AT.

17. A system for monitoring access terminals in a wireless communications network comprising a plurality of wireless cells, said system comprising:
    a base station for issuing a quick page (QP) configuration message in a first broadcasting channel to a QP group;
    the base station for issuing a QP message in a second broadcasting channel to said QP group, wherein said QP message is transmitted in a single frequency network (SFN) mode;
    the base station for scrambling a page forward link assignment message (PFLAM) using a page media access control (MAC) ID, said PFLAM assigning an RP channel to each sector sector in said QP group;
    the base station for issuing said PFLAM to said each sector of said QP group, wherein said PFLAM is sent in said each sector according to a time-frequency resource defined by said each sector; and
the base station for transmitting an RP message on said RP channel using a same time-frequency resource in said each sector of said quick page group.

18. The system of claim 17 wherein said QP configuration message comprises one or more of:
   signaling indicating a scrambling code of a QP channel;
   signaling identifying said each sector of said group of sectors; and
   signaling identifying a group dedicated pilot pattern embedded in said QP channel.

19. The system of claim 18 wherein said QP configuration message is available at one or more of
   a system overhead message; and
   a neighbor list message.

20. The system of claim 17 wherein said second broadcasting channel comprises one of:
   a group broadcasting channel; and
   a sector broadcasting channel.

21. The system of claim 20 further comprising:
   the base station for configuring a superframe preamble using a combination of up to eight channels, said combination selected from the group consisting of:
   a QP channel (QPCH);
   a prime broadcasting channel (PBCCH);
   a secondary broadcasting channel (SBCCH); and
   a time-division multiplex (TDM) pilot channel.

22. The system of claim 21 further comprising:
   the base station for embedding a group dedicated pilot into said group broadcasting channel.

23. The system of claim 22 wherein said group broadcasting channel comprises one of:
   said QPCH; and
   said PBCCH.

24. The system of claim 21 further comprising:
   the base station for embedding a sector dedicated pilot into said sector broadcasting channel.

25. The system of claim 24 wherein said sector broadcasting channel comprises said SBCCH.

26. The system of claim 21 further comprising:
   the base station for mapping one or more sector pseudo noise (PN) codes into one or more group PN codes, wherein said one or more group PN codes allows group broadcasting of said PBCCH.

27. The system of claim 18 further comprising:
   the base station for issuing an RP configuration message in said first broadcasting channel, wherein said RP configuration message comprises one or more of:
   said page MAC ID; and
   signaling indicating a scrambling code for said RP channel.

28. The system of claim 27 wherein said RP configuration message is available at one or more of:
   a system overhead message; and
   a neighbor list message.

29. The system of claim 27 wherein said QP configuration message and said RP configuration message are combined into a single message.

30. A computer program product having a non-transitory computer readable medium with computer program logic embodied thereon, said computer program product comprising:
   code for transmitting a quick page (QP) configuration message and a regular page (RP) configuration message in a first broadcasting channel of a wireless communications network;
   code for transmitting a QP message in a second broadcasting channel of said wireless communications network, wherein said QP message is transmitted in a single frequency network (SFN) mode;
   code a page forward link assignment message (PFLAM) using a page media access control (MAC) ID;
   code for transmitting an RP message on an RP channel using a same time-frequency resource in each sector of a QP group; and
   code for transmitting said PFLAM in said each sector of said QP group, said PFLAM assigning said RP channel to said each sector of said QP group at said same time-frequency resource, wherein each of said PFLAMs is transmitted according to a different time-frequency resource defined by said each sector.

31. The computer program product of claim 30 further comprising:
   code for generating said QP configuration message, wherein said QP configuration message comprises one or more of:
   signaling indicating a scrambling code of a QP channel;
   signaling identifying said each sector of said group of sectors; and
   signaling identifying a group dedicated pilot pattern embedded in said QP channel.

32. The computer program product of claim 31 wherein said QP configuration message is available at one or more of:
   a system overhead message; and
   a neighbor list message.

33. The computer program product of claim 30 wherein said second broadcasting channel comprises one of:
   a group broadcasting channel; and
   a sector broadcasting channel.

34. The computer program product of claim 33 further comprising:
   code for generating a superframe preamble using a combination of up to eight channels, said combination selected from the group consisting of:
   a QP channel (QPCH);
   a prime broadcasting channel (PBCCH);
   a secondary broadcasting channel (SBCCH); and
   a time-division multiplex (TDM) pilot channel.

35. The computer program product of claim 34 further comprising:
   code for embedding a group dedicated pilot into said group broadcasting channel; and
   code for embedding a sector dedicated pilot into said sector broadcasting channel.

36. The computer program product of claim 34 further comprising:
   code for mapping one or more sector pseudo noise (PN) codes into one or more group PN codes, said one or more group PN codes for group broadcasting of said PBCCH.

37. The computer program product of claim 31 further comprising:
   code for generating said RP configuration message, wherein said RP configuration message comprises one or more of:
   said page MAC ID; and
   signaling indicating a scrambling code for said RP channel.

38. The computer program product of claim 37 wherein said RP configuration message is available at one or more of:
   a system overhead message; and
   a neighbor list message.

* * * * *

UNITED STATES PATENT AND TRADEMARK OFFICE
CERTIFICATE OF CORRECTION

PATENT NO. : 8,009,603 B2
APPLICATION NO. : 11/841534
DATED : August 30, 2011
INVENTOR(S) : Lu et al.

Page 1 of 1

It is certified that error appears in the above-identified patent and that said Letters Patent is hereby corrected as shown below:

In Col. 16, line 5, claim 30, after "code" insert --for scrambling--.

Signed and Sealed this
Third Day of January, 2012

David J. Kappos
*Director of the United States Patent and Trademark Office*